(12) United States Patent
Conti

(10) Patent No.: US 9,370,280 B2
(45) Date of Patent: Jun. 21, 2016

(54) BLENDER WITH VARYING INTERNALLY AND EXTERNALLY SHAPED CONTAINER

(71) Applicant: Whirlpool Corporation, Benton Harbor, MI (US)

(72) Inventor: Michael P. Conti, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 14/228,573

(22) Filed: Mar. 28, 2014

(65) Prior Publication Data

US 2014/0211586 A1 Jul. 31, 2014

Related U.S. Application Data

(63) Continuation-in-part of application No. 13/623,169, filed on Sep. 20, 2012, now Pat. No. 8,721,165, which is a continuation-in-part of application No. 13/241,743, filed on Sep. 23, 2011, now Pat. No. 8,550,695.

(51) Int. Cl.
*B01F 13/00* (2006.01)
*B01F 11/00* (2006.01)
*B01F 7/00* (2006.01)
(Continued)

(52) U.S. Cl.
CPC ............ *A47J 43/0722* (2013.01); *A47J 43/042* (2013.01); *A47J 43/0727* (2013.01); *B01F 7/162* (2013.01); *B01F 15/00876* (2013.01); *B01F 15/00896* (2013.01)

(58) Field of Classification Search
CPC . A47J 43/046; A47J 43/0722; A47J 43/0727; A47J 43/042

USPC ................... 366/205, 242, 251, 204
See application file for complete search history.

(56) References Cited

U.S. PATENT DOCUMENTS 2,278,125 A    3/1942   Landgraf
2,284,155 A    5/1942   Landgraf
(Continued)

FOREIGN PATENT DOCUMENTS

CN      2445692 Y     9/2001
CN      2936081       8/2007

OTHER PUBLICATIONS

European Patent Application No. 12185509.2 filed Sep. 21, 2012, Applicant: Whirlpool Corporation, European Search Report re: same, mail date: Jan. 13, 2013.

*Primary Examiner* — Tony G Soohoo
*Assistant Examiner* — Anshu Bhatia

(57) ABSTRACT

A blender includes a container having a plurality of ribs projecting into a processing zone of the container. The plurality of spaced ribs each include a width and a depth that taper from a top end section adjacent a teardrop shaped opening of the container to a more narrow bottom end section adjacent a bottom wall of the container. A side wall of the container continuously tapers from the teardrop shaped opening to a substantially square shaped bottom end portion including first, second, third and fourth side wall sections connected to one another at respective rounded corners. A blade assembly is coupled to the container and includes a plurality of blades angled at different planes with respect to a horizontal plane. The blender container further includes a handle adapted to receive a handle of a similar blender container, such that like blender containers can be nested for storage.

15 Claims, 13 Drawing Sheets

(51) Int. Cl.
*A47J 43/07* (2006.01)
*B01F 7/16* (2006.01)
*B01F 15/00* (2006.01)
*A47J 43/042* (2006.01)

(56) References Cited

U.S. PATENT DOCUMENTS

| | | | |
|---|---|---|---|
| 2,352,205 A * | 6/1944 | Karlson | 366/341 |
| 2,794,627 A | 6/1957 | Rodwick | |
| D336,590 S | 6/1993 | Barnard | |
| 5,487,511 A | 1/1996 | Sansone et al. | |
| 5,584,577 A | 12/1996 | Thies | |
| 5,655,834 A | 8/1997 | Dickson | |
| 5,823,672 A | 10/1998 | Barker | |
| 6,092,922 A * | 7/2000 | Kett et al. | 366/205 |
| 6,550,703 B2 | 4/2003 | Williams et al. | |
| 7,063,456 B2 | 6/2006 | Miller et al. | |
| D528,363 S | 9/2006 | Ulanski et al. | |
| 7,350,963 B2 | 4/2008 | Williams et al. | |
| D587,526 S | 3/2009 | Barnard et al. | |
| 7,753,223 B2 | 7/2010 | Boozer et al. | |
| D621,656 S | 8/2010 | Ulanski et al. | |
| 2005/0122837 A1 | 6/2005 | Barvard et al. | |
| 2009/0032551 A1* | 2/2009 | McGinley et al. | 222/129 |
| 2009/0114616 A1 | 5/2009 | White | |
| 2009/0238034 A1 | 9/2009 | Ulanski | |
| 2010/0027373 A1* | 2/2010 | Barnard et al. | 366/347 |
| 2011/0013478 A1 | 1/2011 | Athey | |

* cited by examiner

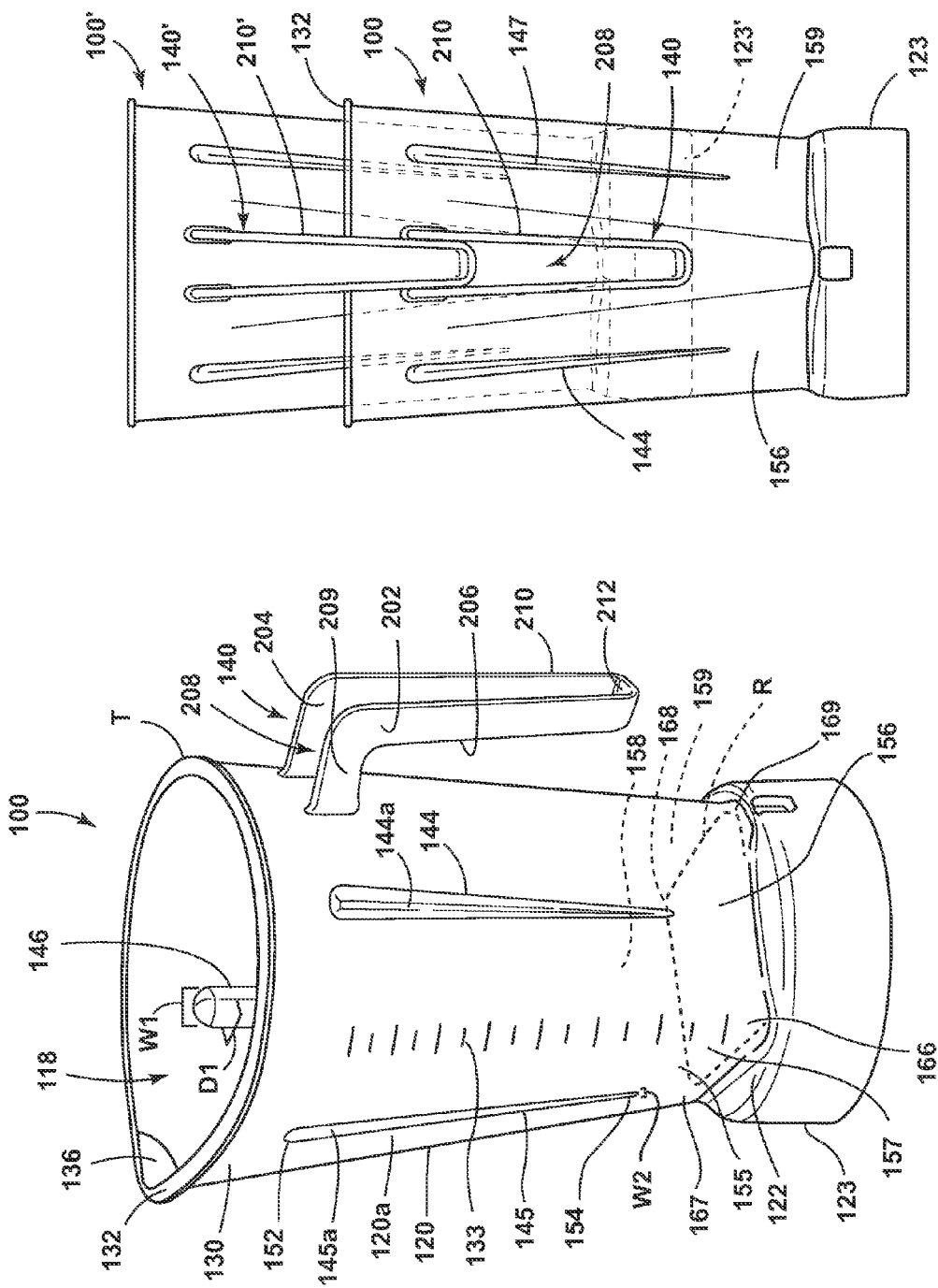

BLENDER WITH VARYING INTERNALLY AND EXTERNALLY SHAPED CONTAINER

CROSS-REFERENCE TO RELATED APPLICATIONS

The present application constitutes a continuation-in-part of U.S. patent application Ser. No. 13/623,169 filed Sep. 20, 2012 entitled "Blender with Varying Internally and Externally Shaped Container", which is a continuation-in-part of U.S. patent application Ser. No. 13/241,743 filed Sep. 23, 2011 entitled "Blender with Varying Internally and Externally Shaped Container".

BACKGROUND OF THE INVENTION

1. Field of the Invention

The present invention pertains to the art of small appliances and, more particularly, to a blender container or jar which internally and externally varies in shape to improve blending performance, as well as its method of use.

2. Discussion of the Related Art

Blenders and similar countertop kitchen appliances generally include a base upon which is situated a jar into which food or other contents can be placed. Typically, blender jars are constructed with a generally circular or oval-shaped cross section. Blades or a similar implement can be activated to operate on the contents of the jar. The jar is generally removable from the base for ease of use and cleaning. The base contains a motor and controls for operating the appliance, whereby the motor drives the blades in response to activation of one of the controls. One example of a circular blender jar can be seen in U.S. Patent Application Publication No. 2011/0013478. Generally, blenders provide the user with a selection of processing methods on a keypad, such as Stir, Chop, Mix, Puree, and Liquify. These methods reflect built-in speeds or control algorithms that enable the user to process a wide range of recipes, such as in the Puree of Soups to the Liquification of Icy Drinks and Fruit Smoothies. Surprisingly enough, even though blenders have been around for more than 70 years, improvements can still be made to enhance blender performance. For instance, a typical drawback of blender models on the market today is that good processing performance in one area often comes at the expense of good processing performance in other areas. As one example, one can find narrow, funnel shaped blender containers that are generally capable of pureeing recipes such as soups to a smooth consistency. However, these narrow, funnel shaped containers are often not as capable in the chopping and processing of large food items such as ice or icy drinks, as these large food items are not able to make their way through the narrow container necks and into the path of the blades.

SUMMARY OF THE INVENTION

The present invention is directed to a blender including an improved blender container having a container geometry which helps to enhance performance throughout a wide range of recipes (as in the puree of soups to the liquification of icy drinks and fruit smoothies), a wide range of recipe volumes (as in full batch to half batch), and a range of ingredient temperatures (as in frozen to room temperature). The container includes a plurality of substantially triangular shaped ribs projecting into a processing zone of the container. Each of the plurality of spaced ribs includes a width and a depth that taper from a top end section adjacent a teardrop shaped opening of the container to a more narrow bottom end section adjacent a bottom wall of the container. A side wall of the container continuously tapers from the teardrop shaped opening to a substantially square shaped lower end portion including first, second, third and fourth side wall sections connected to one another at respective rounded corners. A handle is attached to an outer portion of the side wall opposite a pour spout. A blade assembly is coupled to the container and includes a plurality of blades extending at varying angles and in different planes with respect to a horizontal plane. Each of the blades includes a beveled bottom leading edge, resulting in a downward suction force that draws ingredients down into the blade for processing.

During use, control elements of the blender may be utilized to initiate the rotation of the blade assembly. As indicated above, operation of the blades establishes a suction force to draw ingredients down into the blades, where the ingredients are chopped or otherwise processed. Ingredients within the blender contact the ribs as they are moved within the processing zone, causing a folding or mixing action of the ingredients within the container.

Additional objects, features and advantages of the present invention will become more readily apparent from the following detailed description of preferred embodiments when taken in conjunction with the drawings wherein like reference numerals refer to corresponding parts in the several views.

BRIEF DESCRIPTION OF THE DRAWINGS

FIG. 7 is a perspective view of a blender container constructed in accordance with another embodiment of the invention;

FIG. 8 is a perspective view of the blender container of FIG. 7 in a nested configuration with a similar blender container;

DETAILED DESCRIPTION OF PREFERRED EMBODIMENTS

Figure 1:
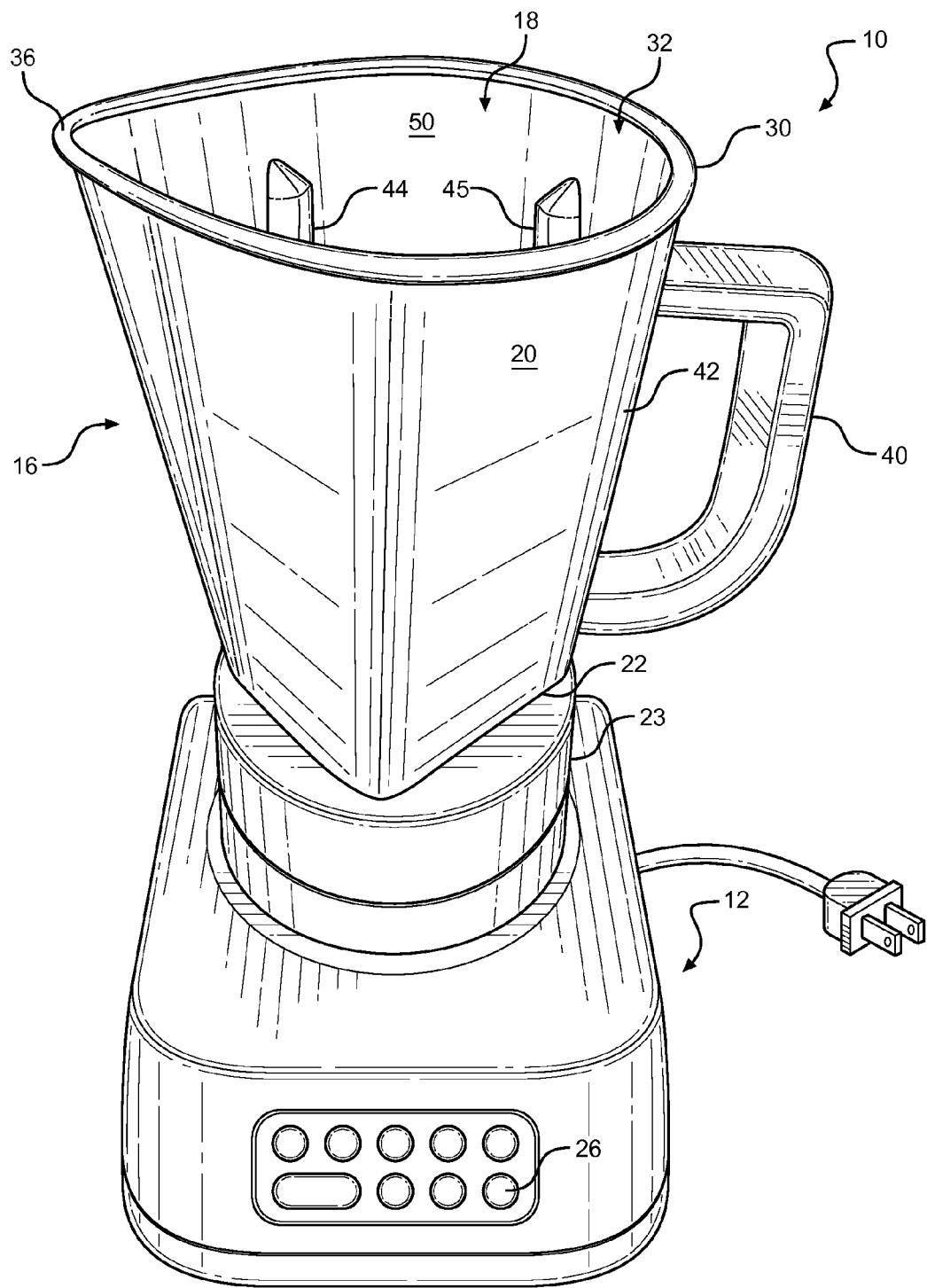
FIG. 1 is a front perspective view of a blender assembly of the present invention.

With initial reference to FIG. 1, a blender 10 is shown including a base section 12 and a removable blender jar or container 16 constructed in accordance with the present invention. With reference to both FIGS. 1 and 2, blender container 16 includes a processing zone 18 defined by a side wall 20 and a bottom wall 22. Additionally, a base portion 23 of blender container 16 extends downward from bottom wall 22 and provides an engagement means to connect blender container 16 to base section 12. In the most preferred embodiment, blender container 16 is molded from polycarbonate, although container 16 could be made from any food compatible and dishwasher safe material.

Figure 2:
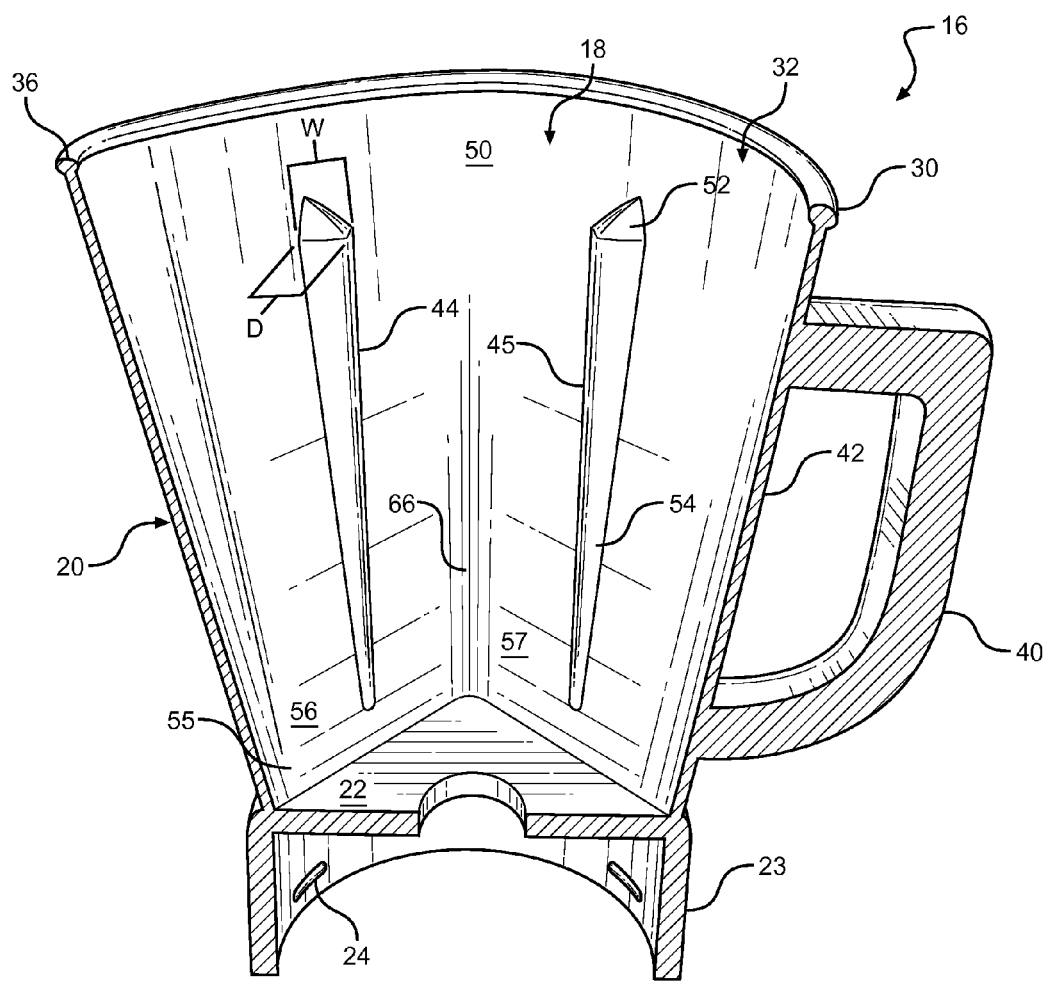
FIG. 2 is a cross-sectional side view of the blender container of FIG. 1.

At this point, it should be understood that base portion 23 can engage base section 12 in any known manner in the art. For example, as depicted in FIG. 2, base portion 23 can include coupling flanges indicated at 24 that are adapted to engage mounting portions (not shown) of base section 12 to secure base portion 23 to base section 12 upon a slight relative rotation. Such attachment methods are well known in the art and not considered part of the present invention such that they will not be discussed in detail herein. In addition, base section 12 can include any known type of blender drive system. That is, although not depicted, it is well known in the art to provide a base section of a blender with a motor for engaging and driving a blade assembly, as well as various control elements such as those indicated at 26. The specific controls, as well as details of base section 12, do not constitute part of the present invention, and one skilled in the art would understand how to utilize known blender drive technology in connection with the present invention.

With continued reference to FIGS. 1 and 2, side wall 20 includes a top portion 30 defining an upper opening 32 that provides access to processing zone 18. In a manner known in the art, a lid (not shown) can be utilized to selectively seal upper opening 32, such as during a food blending event. As shown, upper opening 32 is substantially tear-drop shaped, and a narrow end of upper opening 32 defines a pour spout 36. A handle 40 is provided along an outer portion 42 of side wall 20 opposite pour spout 36. Handle 40 can be any type of handle configured to allow a user to grip the handle and manipulate blender container 16.

Figure 3:
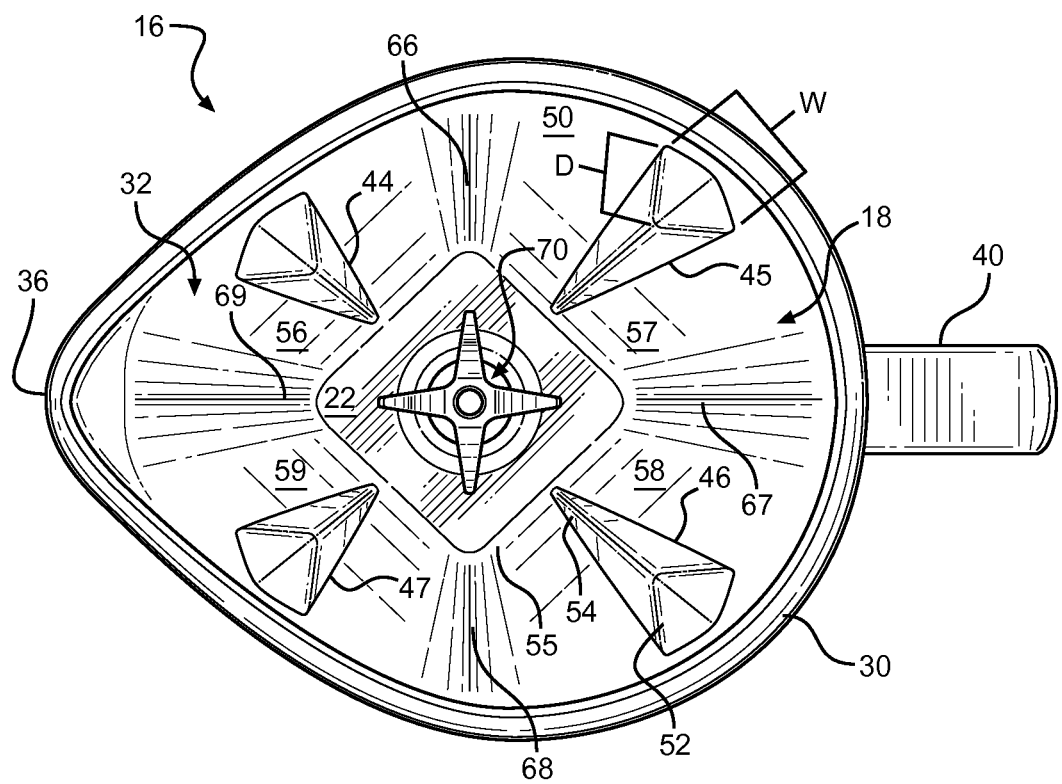
FIG. 3 is a top view of the blender container of FIG. 1.

With particular reference to FIGS. 2 and 3, a plurality of spaced ribs indicated at 44-47 project from an inner portion 50 of side wall 20 within processing zone 18. In the preferred embodiment, each of the plurality of spaced ribs 44-47 has a substantially polygonal, most preferably substantially triangular, shape in cross-section including a width W and a depth D both of which taper from a top end section 52 spaced below upper opening 32 to a more narrow bottom end section 54 spaced from but directly adjacent bottom wall 22. In one embodiment, each of ribs 44-47 has a beginning depth D of approximately 13.5 mm and a beginning width W of approximately 23.4 mm. This narrowing rib profile has been found to provide additional "folding" or mixing action of contents at any horizontal plane within container 16, thus increasing blending performance. In accordance with the preferred embodiment of the present invention, side wall 20 terminates in a substantially square shaped bottom end section 55 defined by first, second, third and fourth side wall sections 56-59 connected to one another at respective corners 66-69, with corners 66-69 being substantially equally spaced from respective ones of the plurality of spaced ribs 44-47. With this arrangement, container 16 tapers in a substantially continuous manner from substantially teardrop shaped upper opening 32 to substantially square shaped bottom end section 55. That is, container 16 tapers from a more rounded geometry at upper opening 32 to a polygonal geometry at bottom end section 55. Preferably, corners 66-69 are maintained slightly rounded, which enhances blending performance and effectively aids in cleaning food or other contents from within container 16. The dimension of each side wall section 56-59 at the bottom end section 55 is preferably in the range of 62.8-82.8 mm. Interestingly, significant performance degradation was found to occur when the dimensions of bottom end section 55 exceeded these optimal parameters. With this arrangement, container 16 tapers in a substantially continuous manner from substantially teardrop shaped upper opening 32 to substantially square shaped bottom end section 55, where the transition of teardrop to square shape occurs approximately ½ down the wall of the container.

Figure 4:
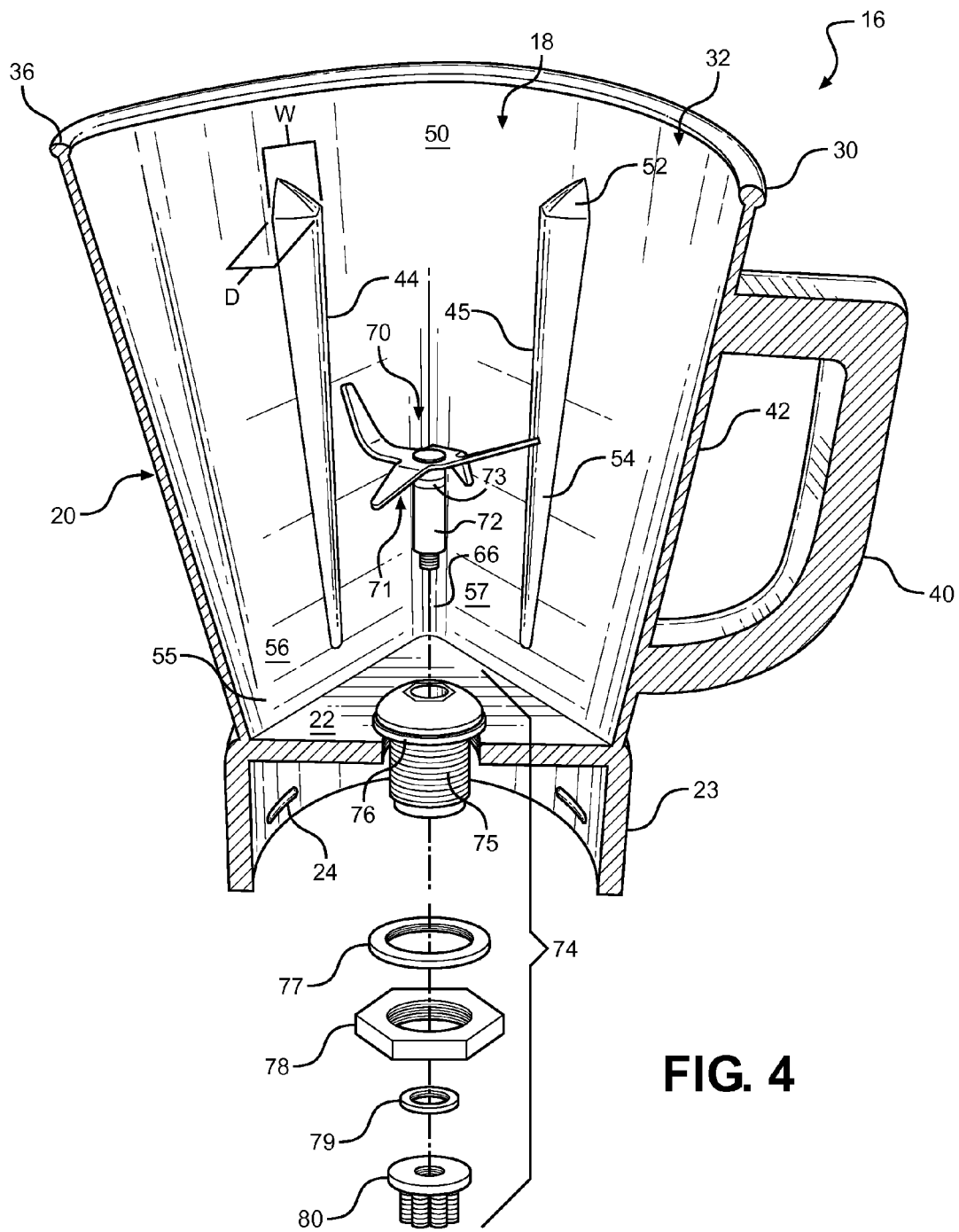
FIG. 4 is an exploded, cross-sectional side view of the blender container of FIG. 1 including a blade assembly.

A blade assembly 70 for use with container 16 will now be discussed in more detail with reference to FIG. 4. Blade assembly 70 includes a blade set indicated at 71 extending from a shaft assembly 72 having a rubber gasket 73 extending thereabout. A coupling assembly indicated at 74 is employed to connect blade set 71 to bottom wall 22 of container 16. Although other known coupling arrangements could be employed, in the embodiment shown, coupling assembly 74 includes an externally threaded bearing 75, a flexible rubber seal 76 configured to extend between a head portion (not labeled) of bearing 75 and bottom wall 22, a metal washer 77 configured to seat against seal 76, a nut 78 for threading onto bearing 75 to secure bearing 75 to bottom wall 22, a smooth Teflon® washer 79 and a drive coupling 80 for threading onto shaft assembly 72.

Figure 5A:
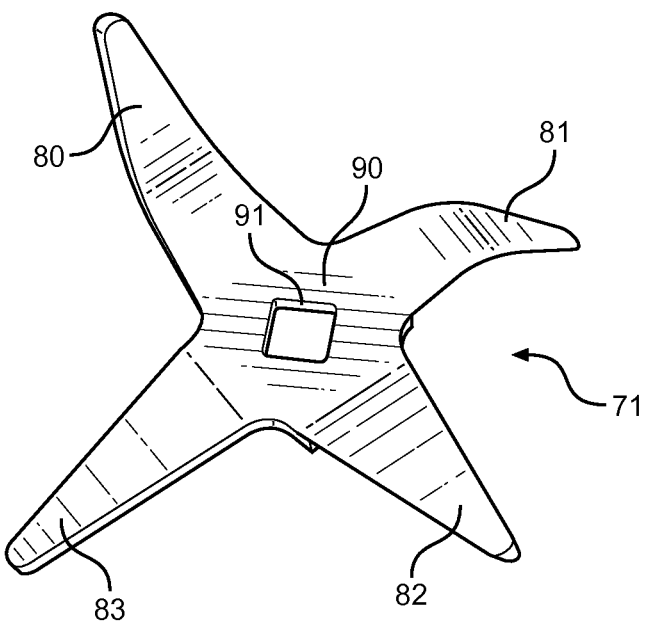
FIG. 5A is an upper perspective view of a blade set for use with the present invention.
Figure 5B:
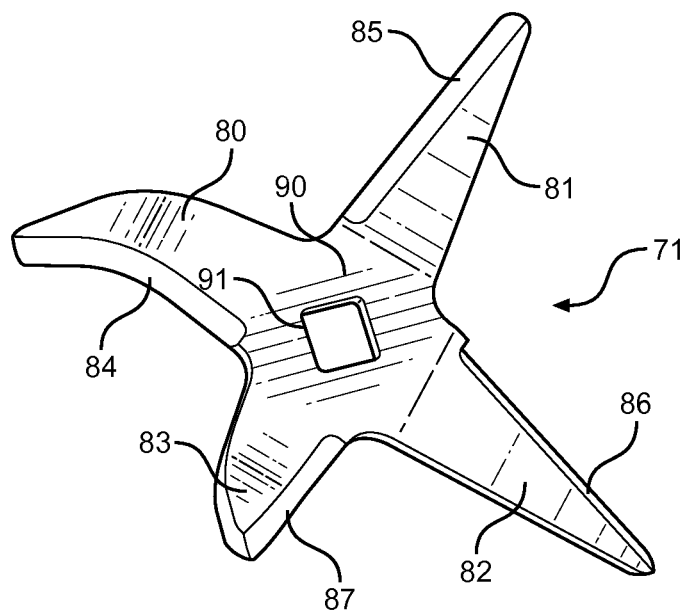
FIG. 5B is a lower perspective view of the blade set of FIG. 5A.

The details of blade set 71 will now be discussed with particular reference to FIGS. 4, 5A and 5B, wherein blade set 71 is shown removed from shaft assembly 72. Blade set 71 includes four cutting blades 80-83 which are distinctly angled or oriented to process ingredients in four different planes. That is, each of blades 80-83 has a different orientation with respect to the horizontal. As perhaps best shown in the preferred embodiment represented in FIGS. 4 and 5A, blade 80 preferable angles abruptly upward generally in the order of 75-80°, blade 81 angles abruptly downward generally in the order of 50-55°, blade 82 angles slightly upward generally in the order of 19-25° and blade 83 angles slightly downward generally in the order of 15-18°. With reference to FIG. 5B, it can be seen that each blade 80-83 includes a respective leading edge 84-87 which is beveled from on a bottom surface 90 of each blade 80-83. When blade set 71 is rotated, the beveled edges 84-87 provide a downward suction force to draw ingredients down into the blade for processing. It should be understood that, when mounted for use, shaft assembly 72 extends through a polygonal-shaped aperture 91 formed in bottom surface 90 to drivingly interconnect shaft assembly 72 to blade set 71 as depicted in FIG. 4.

In use, container 16 is connected to base section 12 of blender 10 and ingredients are inserted into processing zone 18. Control elements 26 are utilized by a user to activate blender 10, and thereby initiate the rotation of blade set 71. Spinning blade set 71 provides a central, downward suction force to draw ingredients down into blade 71, where they are chopped or otherwise processed. Ingredients within the blender contact ribs 44-47 as they are moved within the blender, causing a folding or mixing action of the ingredients within container 16. Once a mixing or blending event has been terminated, the processed ingredients can be poured out of container 16 via pour spout 36.

The nature of container 16, having wall tapering which starts from a more turbulent square shape at bottom to a less turbulent teardrop shape at top and is counterbalanced by an opposingly tapered series of triangular shaped ribs, acts to enhance the blending performance at any horizontal processing plane. This enhanced performance has been demonstrated through a series of tests where the performance of the container has been verified to be more robust to a wide range of recipes (as in the puree of soups to the liquification of icy drinks and fruit smoothies), various recipe volumes (as in full batches to half batches or less), and a range of ingredient temperatures (as in frozen to room temperature). More specifically, experiments were conducted comparing the container 16 of the present invention to a current production rounded container constructed in accordance with the Whirlpool 560 JP container shown in U.S. Patent Application No. 20110013478. It was found that, in general, container 16 completed blending in a smaller amount of time versus the rounded container with no ribs. While not wishing to be bound by the theory, it is thought that corners 66-69 function in conjunction with ribs 44-47 to provide more turbulence in the generally laminar flow of ingredients. This created turbulence enhances the folding action of ingredients into the path of blade set 71, thus enhancing the blending performance of container 16. Experimental results are depicted below in Tables 1-6. Initially, ingredients for a strawberry banana smoothie were put into container 16 and the current production container, and blended for 10 seconds at a high speed. Container 16 outperformed the current production container for both a full recipe run and a half recipe run.

TABLE 1

Strawberry Banana Smoothie: % Processed at 10 Seconds

| Jar Type | Current Production Jar | Tapered Square Jar |
|---|---|---|
| Full Recipe | 99.8* | 100 |
| Half Recipe | 99.9 | 100 |

(results for an average of two runs)
*Results not repeatable at 10 seconds.

TABLE 2

Ice Crush Test - Rubbermaid ™ tray: % Processed at 25 Seconds

| Jar Type | Current Production Jar | Tapered Square Jar |
|---|---|---|
| Full Recipe | 97.2 | 98.5 |
| Half Recipe | 98.9 | 100 |

(results for an average of two runs)

Table 2 above illustrates the results of an ice crush test utilizing ice cubes from a 16 count Rubbermaid™ ice tray, i.e., a 16 count ice tray for making ice cubes generally 49 mm×28 mm×27 mm in size. Ice was added to container 16 and the current production container, and blended for 25 seconds. The current production container produced a product having a wet snow consistency, with 13 ice chunks remaining for the full recipe and 12 ice chunks remaining for the half recipe. Container 16 of the present invention produced a product having a powdery snow-like consistency, with 12 ice chunks remaining for the full recipe and 0 ice chunks remaining in the half recipe. The same experiment was conducted using a Whirlpool™ 14 count ice tray, i.e., 1 14 count ice tray for making ice cubes roughly 43.25 mm×32.25 mm×26.5 mm in size, the results of which are presented below in Table 3. The current production container produced a product having 14 ice chunks remaining for the full recipe and 3 large ice chunks remaining for the half recipe. Container 16 of the present invention produced a product having a powdery snow-like consistency, with 2 ice chunks remaining for the full recipe and 2 ice chunks remaining in the half recipe.

TABLE 3

Ice Crush Test - Whirlpool ™ tray: % Processed at 25 Seconds

| Jar Type | Current Production Jar | Tapered Square Jar |
|---|---|---|
| Full Recipe | 98.1 | 99.8 |
| Half Recipe | 99.2 | 99.7 |

(results for an average of two runs)

TABLE 4

Cranana-Daiquiri: % Processed at 30 Seconds

| Jar Type | Current Production Jar | Tapered Square Jar |
|---|---|---|
| Full Recipe | 100 | 100 |
| Half Recipe | 96.9 | 99.9 |

(results for an average of two runs)

Table 4 illustrates another experiment wherein frozen drink ingredients were mixed at 30 seconds at high speeds in both the current production jar and container 16 of the present invention. The current production jar resulted in various small ice particles so as to be gritty, while container 16 resulted in a smooth texture in the half recipe run.

TABLE 5

Broccoli Soup Puree: % Processed

| Jar Type | Current Production Jar | Tapered Square Jar |
|---|---|---|
| Full Recipe | 98.4 | 99.0 |
| Half Recipe | 95.9 | 99.0 |

(results for an average of two runs)

Table 5 illustrates yet another experiment wherein the ingredients for broccoli soup were mixed in both the current production container and container 16. The current production jar produced a product having 2 chunks in the full recipe and 4 chunks in the half recipe, whereas container 16 produced 0 chunks in the full recipe and only 2 chunks in the half recipe.

TABLE 6

Tomato Soup Puree: % Processed

| Jar Type | Current Production Jar | Tapered Square Jar |
|---|---|---|
| Full Recipe | 99.4 | 99.3 |
| Half Recipe | 99.5 | 99.6 |

(results for an average of two runs)

A final experiment, the results of which are presented in Table 6 above, was conducted wherein tomatoes where mixed in both the current production jar and container 16. The current production jar produced a product including 1 chunk in the full recipe and 0 chunks in the half recipe. Container 16 produced a product having 0 chunks in either the full recipe or half recipe.

From the above experimental results it can be seen that, overall, container 16 outperforms the prior art container and advantageously reduces time required for thorough processing of ingredients. More specifically, the overall shape of the container, the details of the ribs and the configuration of the blade assembly synergistically combine in various ways to provide for enhanced blending performance. In addition, the nature of the container design not only enhances blending performance but the unique teardrop shape also acts as an integrated pouring spout, thus enhancing pouring performance.

Figure 6:
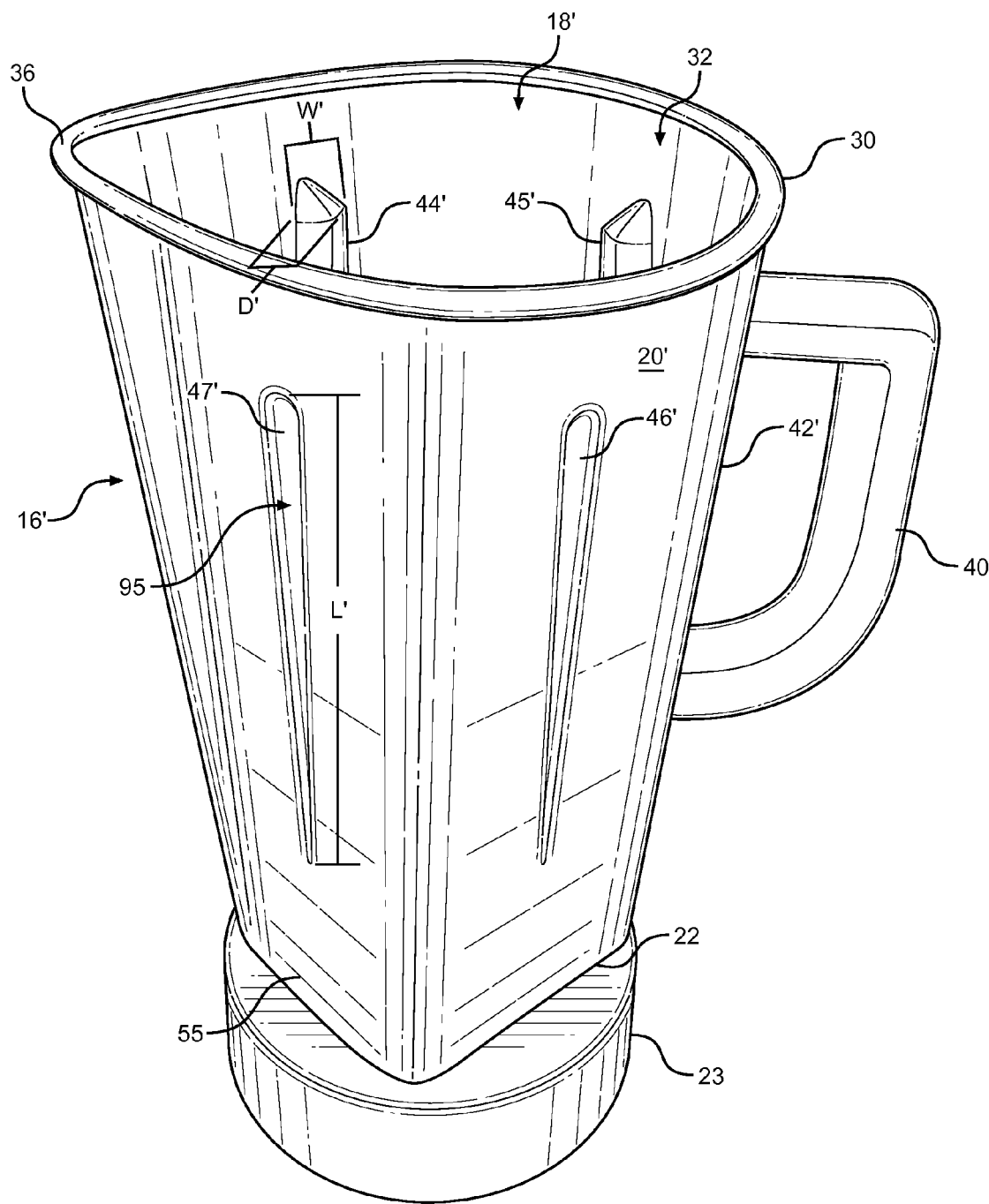
FIG. 6 is a perspective view of a blender container constructed in accordance with another embodiment of the invention.

Reference will now be made to FIG. 6 in describing a blender container 16' constructed in accordance with another embodiment of the invention. In general, blender container 16' has the same upper and lower container structure and dimensions as blender container 16 such that like reference numerals are presented for the corresponding structure. However, blender container 16' is elongated relative to blender container 16 such that blender container 16' includes a larger processing zone 18' defined, in part, by an elongated side wall 20'. However, bottom wall 22 and base portion 23 of blender containers 16 and 16' are identical, thereby providing a common engagement means to connect either blender container 16, 16' to base section 12. In the most preferred embodiment, blender container 16' is also molded from polycarbonate although, like container 16, container 16' could be made from any food compatible and dishwasher safe material.

As indicated above, the upper structure of blender container 16' is the same as blender container 16. Therefore, blender container 16' includes a top portion 30 defining an upper opening 32 that provides access to processing zone 18'. As described in connection with container 16, a lid (not shown) can be utilized to selectively seal upper opening 32, such as during a food blending event. As shown, upper opening 32 is substantially teardrop shaped, and a narrow end of upper opening 32 defines a pour spout 36. In a manner commensurate with structure provided on blender container 16, handle 40 is provided along an outer portion 42' of side wall 20' opposite pour spout 36.

As clearly shown in FIG. 6, side wall 20' of blender container 16' is provided with a plurality of spaced ribs indicated at 44'-47' which project into processing zone 18'. In this embodiment, each of the plurality of spaced ribs 44'-47' still has a substantially polygonal, most preferably substantially triangular, shape in cross-section. Each rib 44'-47' has a width W' and a depth D' both of which taper from a top end section (not separately labeled) spaced below upper opening 32 to a more narrow bottom end section (also not separately labeled) spaced from bottom wall 22. As indicated above, blender container 16' has an enlarged processing zone 18' relative to blender container 16. For instance, where blender container 16 can be sized to about 1.66 liters (56 ounces), blender container 16' is sized for about 1.78 liters (60 ounces). With the taller size container and the same sized upper and lower structure, side wall 20' assumes a smaller angle from the vertical than that shown for side wall 20 in FIG. 2. It has been found that this change, along with reduced width W' and depth D' dimensions of ribs 44'-47' relative to ribs 44-47, establishes commensurate performance levels to those discussed above. To this end, each rib 44'-47' has a beginning depth D' of approximately 6 mm and a beginning width W' of approximately 17 mm. By way of example for this embodiment, with a length for side wall 20' of approximately 224 mm, a tapering rib length L' in the order of 186 mm (greater than 80% of the overall length of the side wall) is provided. Regardless of the actual dimensions, this narrowing rib profile still provides the additional "folding" or mixing action of contents at any horizontal plane within container 16', thus increasing blending performance along the lines of container 16.

As indicated above, blender container 16' is preferably molded. As shown in this embodiment, the molding operation utilizes material associated with side wall 20' to establish ribs 44'-47', thereby resulting in tapering recesses 95 spaced about side wall 20'. As also indicated above, the configuration of the lower portion of blender container 16' is the same as blender container 16 such that side wall 20' terminates in a substantially square shaped bottom end section 55, with slightly rounded corners (not labeled) being substantially equally spaced from respective ones of the plurality of spaced ribs 44'-47'. With this arrangement, container 16' also transitions in a substantially continuous manner from substantially teardrop shaped upper opening 32 to substantially square shaped bottom end section 55. That is, container 16' tapers from a more rounded geometry at upper opening 32 to a polygonal geometry at bottom end section 55 which can correspondingly accommodate blade set 71.

Referring now to FIG. 7, a blender container 100 is shown as constructed in accordance with another embodiment of the invention. In general, blender container 100 has a processing zone 118 defined by a side wall 120 and a bottom wall 122. A base portion 123 extends downward from bottom wall 122 and provides engagement means to connect the blender container 100 to a base section of a blender, such as base section 12 of blender 10 shown in FIG. 1. It is contemplated that the blender container 100 is molded from polycarbonate, much like blender container 16 described above. However, it is further contemplated that the blender container 100 can be made from any food compatible and dishwasher safe material. Side wall 120 of the blender container 100 includes an upper portion 130 which defines an upper opening 132. The upper opening 132 provides access to the processing zone 118 for introducing ingredients to the blender container 100 in preparation of a blending procedure. Much like blender container 16 described above, upper opening 132 is adapted to receive a lid which can be utilized to selectively seal the processing zone 118 at the upper opening 132 during a blending procedure. As further shown in FIG. 7, the upper opening 132 of the upper portion 130 of the blender container 100 includes a substantially teardrop shaped configuration T having a pour spout 136 disposed at the narrow end of the upper opening 132. On an opposite side of the side wall 120 relative to the pour spout 136, a handle 140 extends outwardly from the side wall 120. The handle 140 allows a user to engage and manipulate the blender container 100 in use, and also includes nesting features as further described below.

As further shown in FIG. 7, as well as FIG. 8, a plurality of spaced ribs 144, 145, 146, 147 project inwardly from the side wall 120 into the processing zone 118. Much like the spaced ribs 44-47 described above with reference to blender container 16, the spaced ribs 144, 145, 146, 147 include a width W1 and a depth D1 which taper from a top end section 152 to a more narrow bottom end section 154 having a width W2 and a depth D2, as better shown in FIG. 11. The top end section 152 is spaced below upper opening 132, while the bottom end section 154 is spaced from and yet adjacent to bottom wall 122. As described above with reference to blender container 16, the profile of the spaced ribs 144, 145, 146, 147 provides additional folding or mixing action of ingredients disposed in the processing zone 118 during a blender procedure. This folding or mixing action is present along any horizontal plane within blender container 100, such that the blending performance of blender container 100 is increased as compared to a standard blender container.

As further shown in FIG. 7, the side wall 120 of the blender container 100 terminates in a substantially square shaped or rectangular shaped configuration R at a lower portion 155 which is disposed adjacent to bottom wall 122. The substantially rectangular shaped lower portion 155 is defined by first, second, third and fourth side wall sections 156-159, further shown in FIG. 11, which are connected to one another at respective corners 166-169. Corners 166-169 are substantially equally spaced from respective ones of the plurality of spaced ribs 144-147. With this arrangement, blender container 100 tapers in a substantially gradual and continuous manner from the substantially teardrop shaped configuration T of the upper portion 130, to the substantially rectangular shaped configuration R of the lower portion 155. That is, container 100, much like container 16 described above, tapers from a more rounded geometry at upper opening 132 to a polygonal geometry at lower portion 155. Preferably, corners 166-169 are maintained slightly rounded, which enhances blending performance and effectively aids in cleaning food or other contents from within container 100. With this arrangement, blender container 100 tapers in a substantially continuous manner along side wall 120 from the substantially teardrop shaped configuration T to the substantially rectangular shaped configuration R, wherein the transition of the teardrop shape to the square shape occurs approximately ½ down the side wall 120 of the blender container 100 at or near intermediate portion 133.

As further shown in FIG. 7, the handle 140 is provided at corner 169 opposite the pour spout 136 and corner 167. As shown, handle 140 includes a pair of side walls 202, 204 which having a web portion 206 disposed therebetween to define an upwardly opening channel 208 having a generally U-shaped cross section. The side walls 202, 204 and web potion 206 of the channel 208 extend outwardly from the corner 169 to define a lip portion 209, and then turn downwardly to form a tapered grip portion or stem 210 which runs along corner 169 and culminates in a bottom wall 212. The U-shaped channel 208 is an upwardly and outwardly opening channel, such that the blender container 100 can be easily nested with a like container for convenience of shipping or storing. The nesting capabilities of blender container 100 are better shown in FIG. 8 where two blender containers 100, 100' are shown in a nesting configuration. As noted above, the stem portion 210 is tapered, such that the stem portion 210' of blender container 100' is easily received in the channel 208 of blender container 100. Having the tapered configuration in the stem 210 correlates to a tapered channel 208, such that the tapered channel 208 receives stem portion 210' of blender container 100' until stem portion 210' is fully nested in tapered channel 208 blender container 100, as shown in FIG. 8.

Referring again to FIG. 7, the base portion 123 of blender container 100 is circumferentially smaller than the upper opening 132, such that the base portion 123' of blender container 100' can be received in the upper opening 132 blender container 100 in a nested configuration as shown in FIG. 8. As further noted in FIGS. 7 and 8, the ribs 144-147 extend inwardly into processing zone 118, such that indented rib portions 144a-147a are disposed on the exterior surface 120a of side wall 120. In this way, the inwardly extending ribs 144-147 serve as locating features as received in indented rib portions 144a'-147a' of another like blender container 100' in a nested configuration as shown in FIG. 8.

Figure 9:
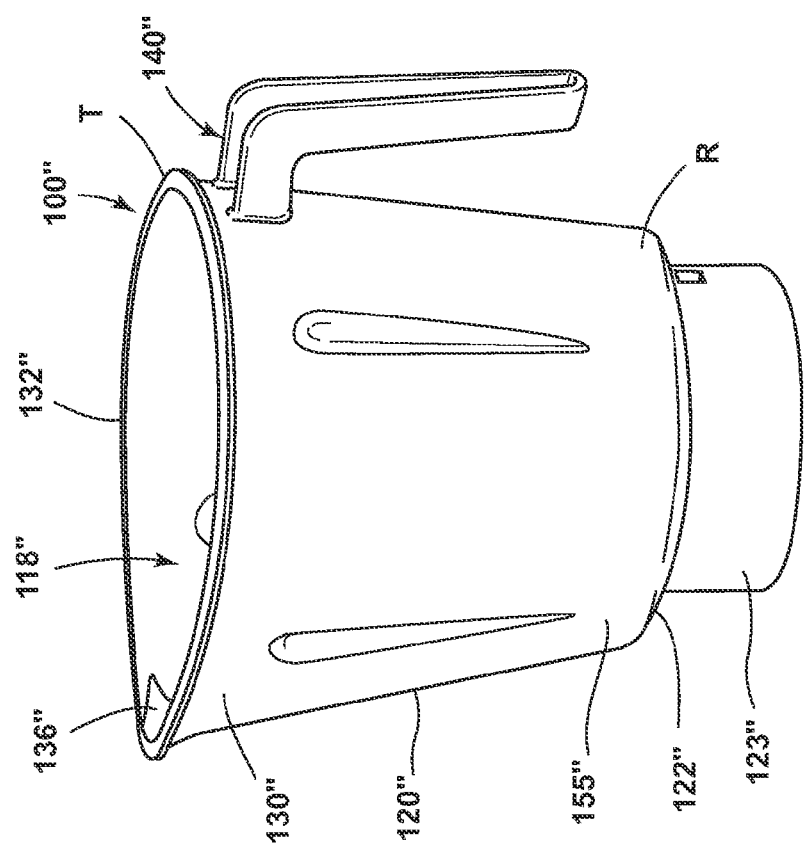
FIG. 9 is a perspective view of a blender container constructed in accordance with another embodiment of the invention.

Reference will now be made to FIG. 9 in describing a blender container 100" constructed in accordance with another embodiment of the invention. In general, blender container 100" has similar basic container structures as blender container 100, such that like reference numerals are presented for the corresponding structure. However, blender container 100" has a shorter and wider configuration for processing zone 118", relative to the elongate side wall 120 of blending container 100 defining processing zone 118. While blender container 100" has a stout configuration relative to the elongate configuration of blender container 100, the respective processing zones 118, 118" have the same in capacity. It is contemplated that the processing zones 118, 118" measure about 64 ounces or 1.89 liters, whereas blender container 16 is noted above as having a capacity of about 56 ounces, with blender container 16' is having a capacity of about 60 ounces. Thus, blender container 100 is elongate in configuration relative to blender container 16 and blender container 100", such that blender container 100 includes a larger processing zone 118 as compared to processing zone 18 of blender container 16, but has the same capacity as blender container 100". This is due in part to the elongated side wall 120 of blending container 100.

Figure 10:
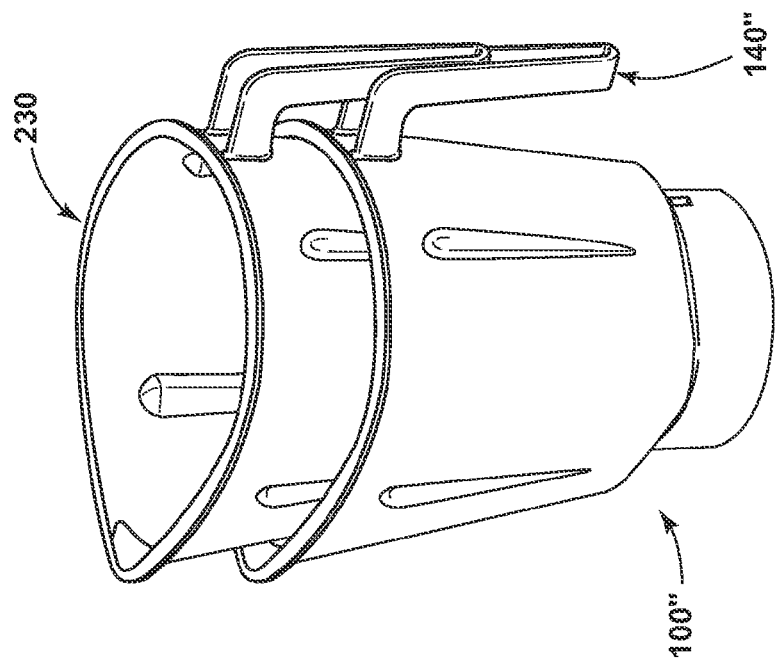
FIG. 10 is a perspective view of the blender container of FIG. 9 in a nested configuration with a similar blender container.

While the configurations of the containers 16, 100 may vary, it is contemplated that bottom walls 22, 122 and base portions 23, 123 of blender containers 16, 100 are identical, thereby providing a common engagement means to connect either blender container 16, 100 to a base section, such as base section 12 shown in FIG. 1. With reference to blender container 100" shown in FIG. 9, the base portion 123", is the same as base portions 23, 123 of blender containers 16, 100, allowing for engagement with base section 12 (FIG. 1). However, the bottom wall 122" of blender container 100" is clearly larger than the base portion 123", as further described below. Thus, while lower portion 155 of blender container 100 is smaller than the base portion 123 as shown in FIG. 7, the lower portion 155" of blender container 100 "is larger than the base portion 123". As further shown in FIG. 9, the blender container 100" also includes a similar dual configuration, wherein the upper portion 132" has a teardrop shaped configuration T, while the lower portion 155" has a rectangular shaped configuration R. The larger bottom wall 122" allows for improved blending performance when a blending procedure calls for ingredients that are not of a liquid variety. For example, when crushing whole ice cubes, the narrow lower configuration 155 of blender jar 100 may not provide enough room for the whole ice cubes to fully migrate into the path of the spinning blade. Having the rectangular shaped configuration R of the lower portion 155" of blender container 100" being larger than the base portion 123", congestion issues are negated when performing certain tasks, such as crushing whole ice cubes. Further, the enlarged bottom wall 122" of the lower portion 155" of blender 100" allows for a larger diameter blade configuration to be disposed within the processing zone 118" of blender container 100", as further described below. The blender container 100" also includes a plurality of ribs similar to ribs 144-147 described above with reference to blender container 100. A handle member 140" extends off the side wall 120" of blender container 100", such that the blender container 100" can be used in a nesting configuration with similar blender container 230 shown in FIG. 10. Thus, handle member 140" of blender container 100" is configured to receive a like handle member in a nested configuration as shown in FIG. 10 in a similar manner as described above with reference to blender containers 100, 100' shown in FIG. 8.

Figure 11:
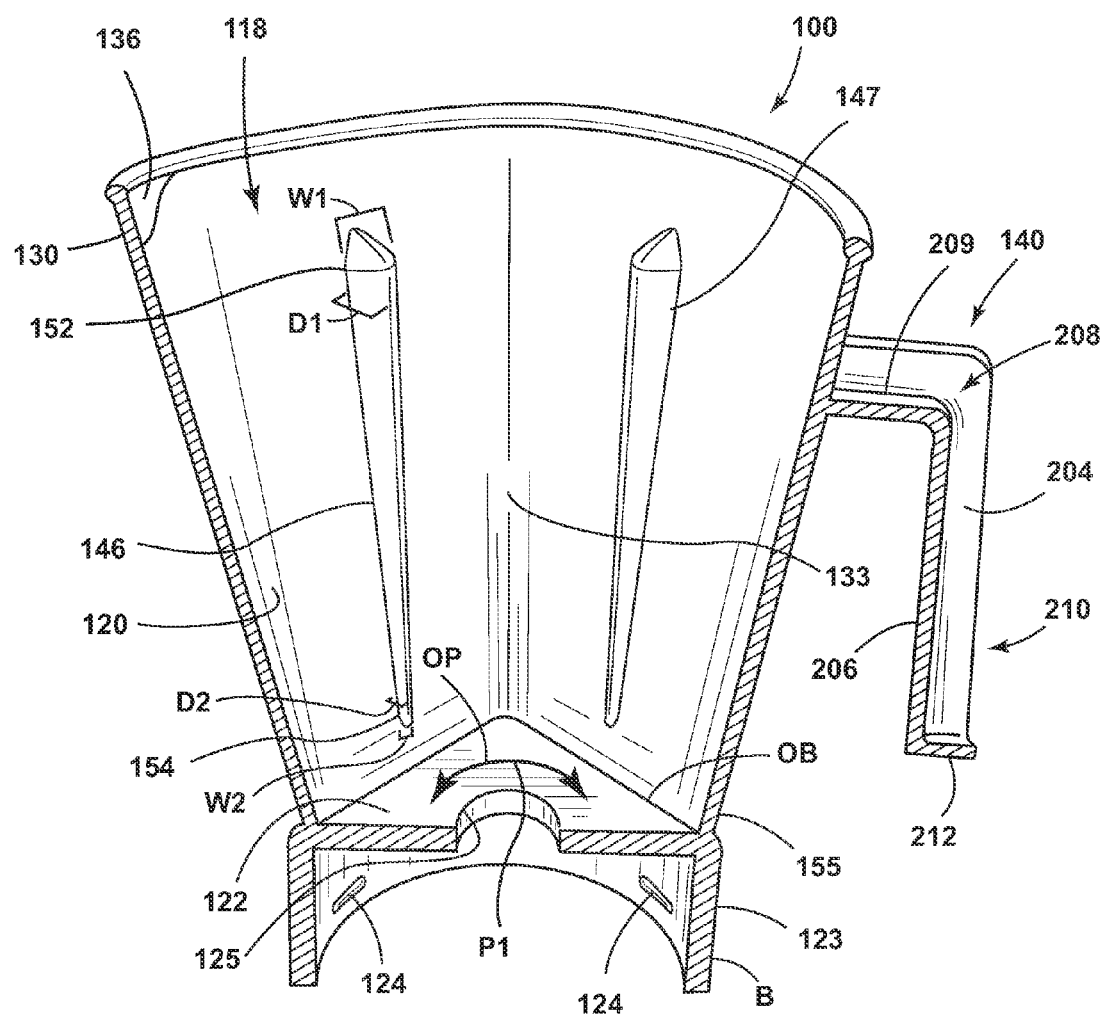
FIG. 11 is a cross-sectional view of the blender container of FIG. 7 taken along line XI.
Figure 12:
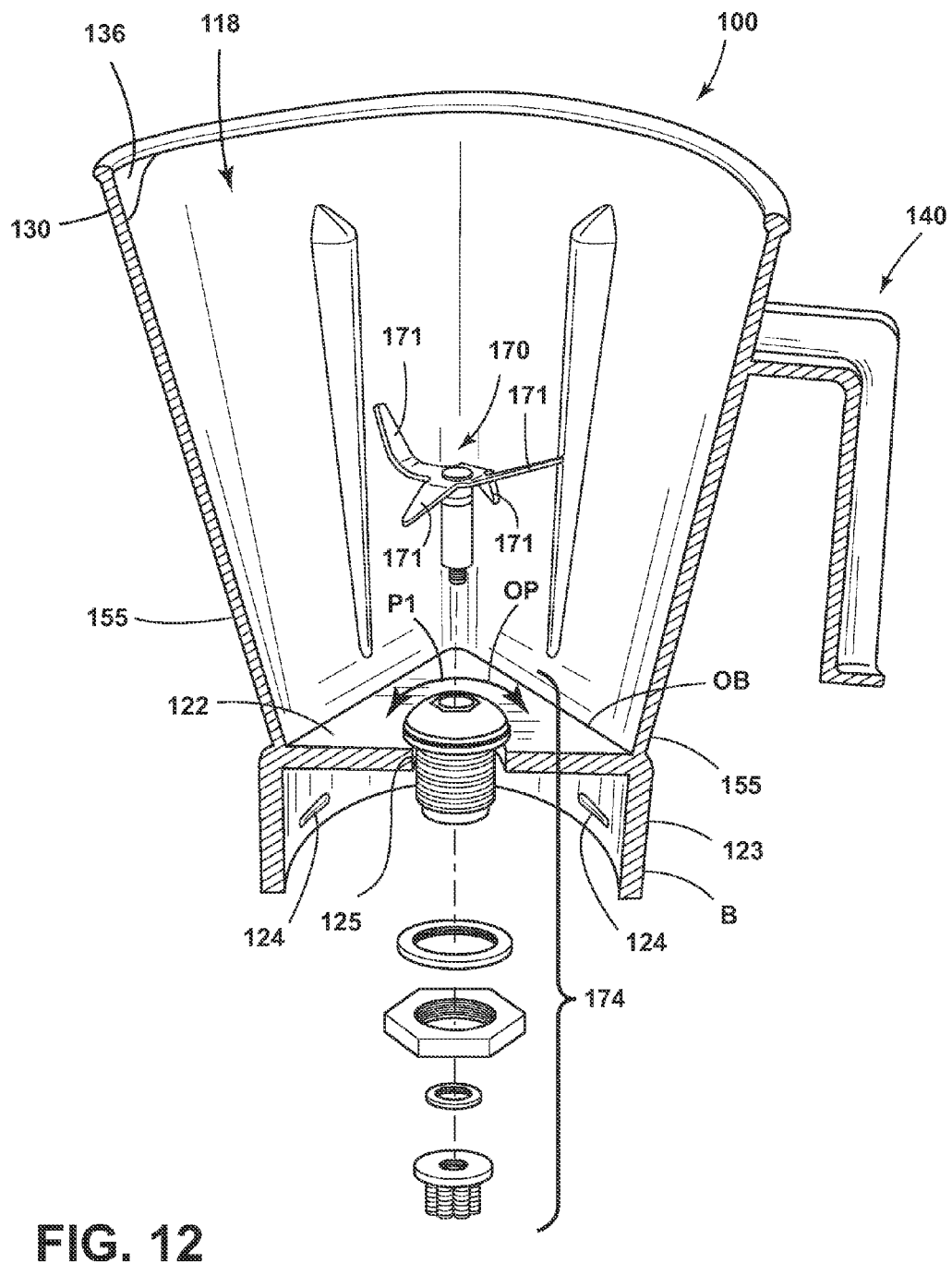
FIG. 12 is an exploded cross-sectional side view of the blender container of FIG. 7 including a blade assembly.

Referring now to FIGS. 11 and 12, inwardly extending ribs 146, 147 are shown, wherein the width W1 and depth D1 at the upper end section 152 is indicated on rib 146. The width W2 and depth D2 at lower end section 154 is also shown, such that the tapered configuration of rib 146 can be explained in that W1 is greater than W2 and D1 is greater than D2. Bottom wall 122 is shown having an outer boundary OB that has a smaller all around size as compared to base portion 123, such that lower portion 155, having the rectangular configuration R is smaller than the base portion 123, such that a blade processing path P1 is also smaller than the base portion 123. The bottom wall 122 further includes an aperture 125 for receiving a blade assembly 170 as shown in FIG. 12. As further shown in FIG. 12, the blade assembly 170 includes a plurality of blades 171 which define the processing path P1 in use. The blades 171 may extend at different angles in a manner as described above with reference to blade assembly 70. The processing path P1 includes an outer perimeter OP defined by a furthest extending blade. The outer perimeter OP is smaller than a boundary surface B of the base portion 123 of the blender container 100. A bearing assembly 174 is used to rotatably couple the blade assembly 170 to the blender container 100 at aperture 125 disposed in bottom wall 122. Coupling flanges 124 are disposed on an inner portion of the base portion 123 for use in coupling the blender container 100 to a base unit of a blender.

Figure 13:
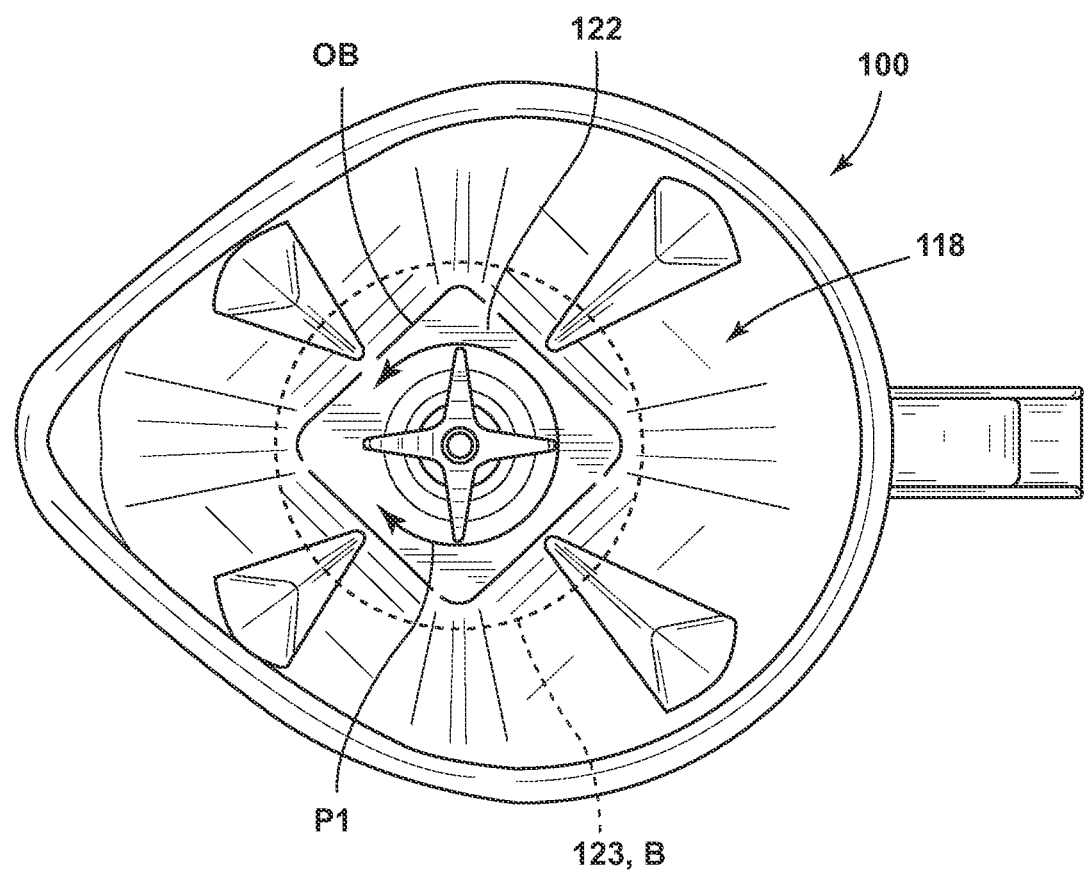
FIG. 13 is a top plan view of the blender container of FIG. 7.

As shown in FIG. 13, the processing path P1 of blade assembly 170 is more fully shown within the processing zone 118 of blender container 100. With the base portion 123 of blender container 100 shown in phantom in FIG. 13, it is clear that the outer perimeter OP of the processing path P1 is less than the boundary surface B which defines an outermost portion of the overall configuration of the base portion 123.

Figure 14:
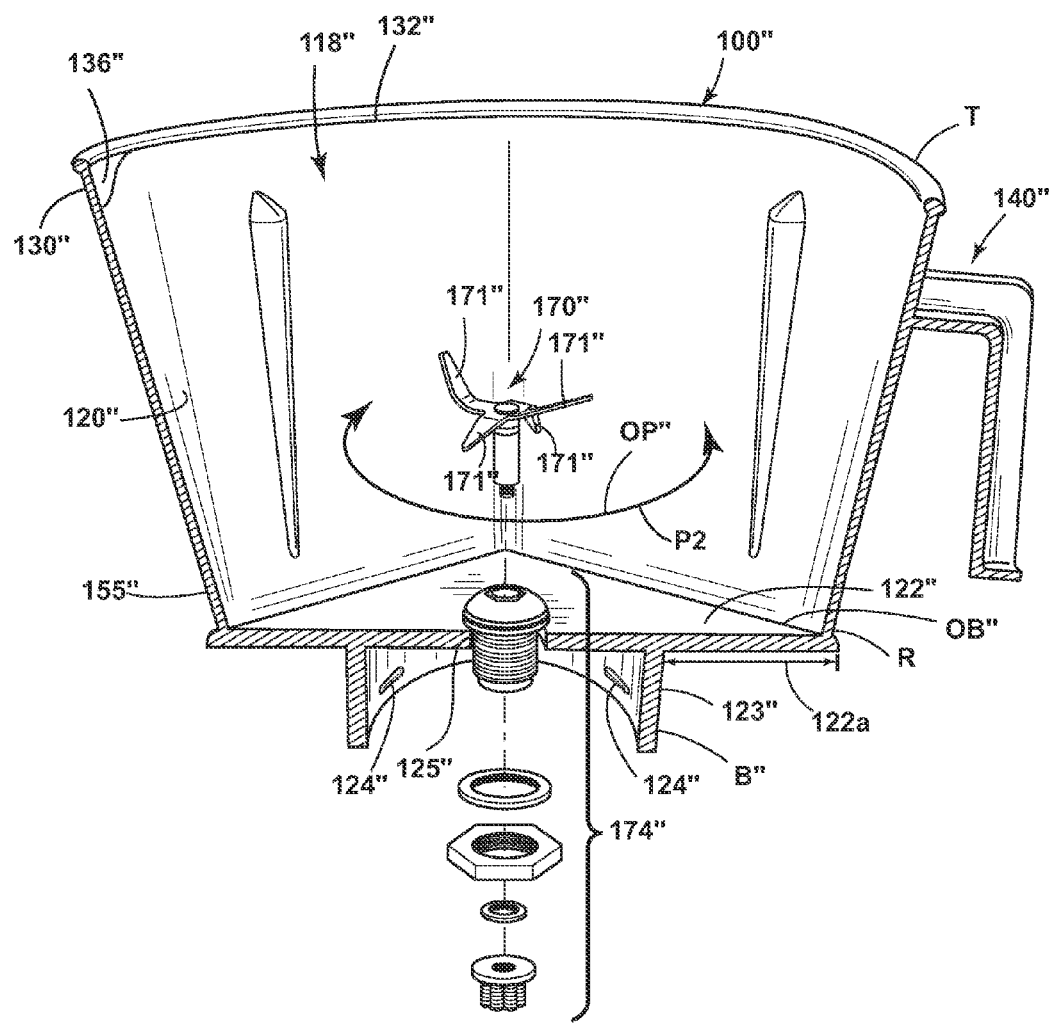
FIG. 14 is an exploded cross-sectional side view of the blender container of FIG. 9 including a blade assembly.
Figure 15:
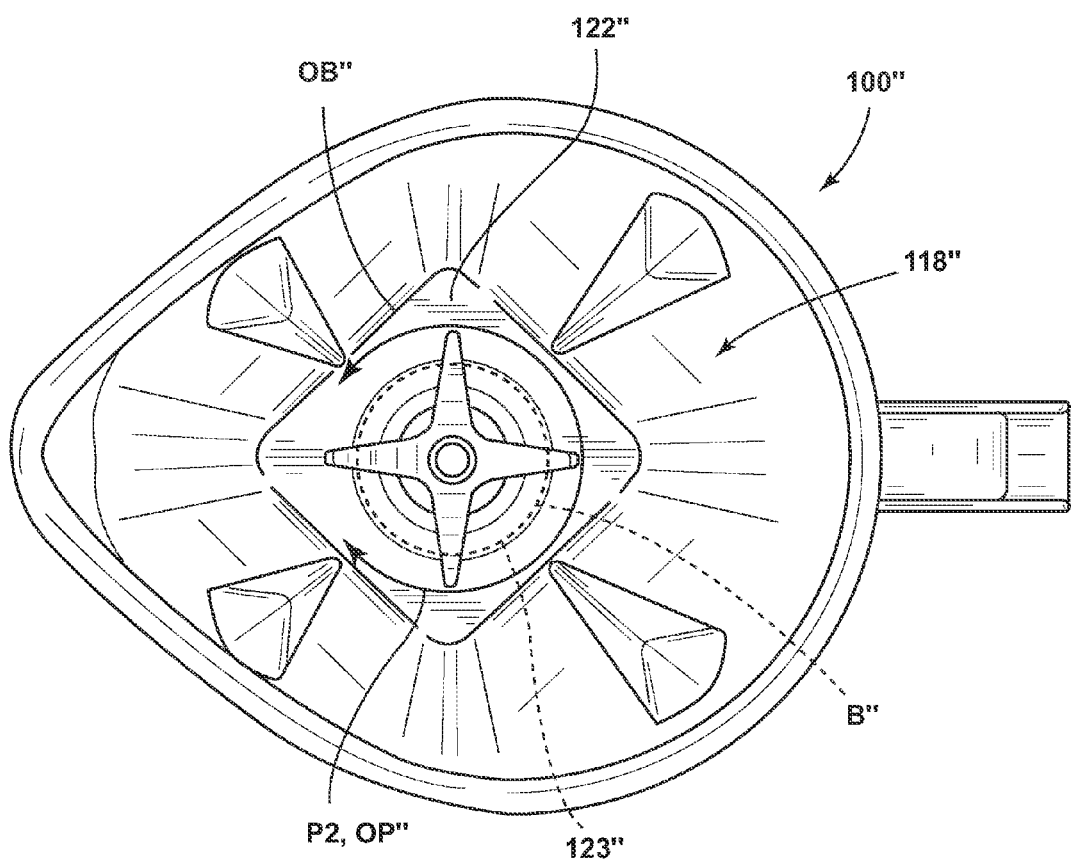
FIG. 15 is a top plan view of the blender container of FIG. 9.

Referring now to FIGS. 14 and 15, the blender container 100" includes a blade assembly 170" disposed within the processing zone 118", and further includes blades 171"' which define a processing path P2 having an outer perimeter OP". As shown in FIGS. 14 and 15, the outer perimeter OP'" of the processing path P2 is larger than a boundary surface B" of the base portion 123". The enlarged processing path P2 is accommodated in this manner by the enlarged bottom wall 122" which extends over the base portion 123" as indicated by arrow 122a. Thus, the bottom wall 122" includes an outer boundary OB" that is larger than the boundary surface B" of the base portion 123". A bearing assembly 174" is used to rotatably couple the blade assembly 170" within the processing zone 118", and is further adapted to couple the blender container 100" in a driven engagement with base unit 12 (FIG. 1). Coupling flanges 124" are disposed on an inner portion of the base portion 123" for use in coupling the blender container 100" to a base unit of a blender.

As further shown in FIG. 15, the blades 171" of blade assembly 170" extend outwardly from the central axis of the blade assembly 170" to define a processing path P2 having an outer perimeter OP'" which is larger than the base portion 123" shown in phantom. The blade assembly 170" has a similar configuration to the assembly shown in FIGS. 5A and 5B, however blade assembly 170" is wider to cover the larger bottom surface 122" of the container 100". The base of the blades 171" of blade assembly can be as wide as about 14 mm-16 mm and the OP'" may be as larger as about 100 mm-120 mm or more preferably 103 mm. Thus, the stout configuration of the blender container 100" provides for a wide processing path adapted for processing ingredients which tend to become wedged in blender jars having a tapered configuration. While the outer boundary OB" of the bottom wall 122" of the blender jar 100" is larger than the base portion 123", the lower portion 155" is still smaller than the upper portion 130", such that the lower portion 155" and base portion 123" can still be received in a nesting configuration as shown in FIG. 10.

Although the height and rib dimensions of the two container embodiments described above vary, the same upper opening enables a common lid to be employed, the identical lower structure enables the same support base to be used and, most importantly, the rib dimensions are matched to the overall configuration of the container to provide for the enhanced performance with a commonly rated drive motor. In any case, although described with reference to preferred embodiments of the invention, it should be readily understood that various changes and/or modifications can be made to the invention without departing from the spirit thereof. In general, the invention is only intended to be limited by the scope of the following claims.

What is claimed is:

1. A blender container for a blender appliance comprising:
a processing zone defined by a side wall and a bottom wall, the side wall including:
an upper portion disposed adjacent to an upper opening to the processing zone, wherein the upper portion includes a substantially teardrop shaped configuration having a smooth continuous non-linear shape at the end of the teardrop;
a lower portion of the side wall having a substantially rectangular shaped configuration defined by a plurality of side wall sections;
a base portion extending downwardly from the bottom wall and configured to be received on the blender appliance;
a blade assembly rotatably received in the processing zone adjacent the bottom wall; and
a handle coupled to an outer surface of the side wall and having an outwardly opening channel defined by first and second side walls having a web portion disposed therebetween, wherein the channel includes an outwardly extending lip portion and a tapered stem portion extending downwardly from the lip portion, the tapered stem portion configured to be received in a channel of a handle disposed on a like blender container in a nested configuration; and
a plurality of substantially polygonal shaped, spaced ribs projecting into the processing zone from the side wall, each of the plurality of spaced ribs including a width and a depth; wherein both the width and the depth of the spaced ribs taper from a top end section adjacent the upper portion of the blender container to a more narrow bottom end section adjacent the bottom wall of the blender container; and wherein a recess is formed in an outer surface of the container behind each rib, wherein each recess tapers in depth and width from a top end section adjacent the upper portion of the blender container to a more narrow bottom end section adjacent the bottom wall of the blender container, to enhance nesting of a like blender container.

2. The blender container of claim 1, wherein the side wall continuously and gradually transitions from the substantially rectangular shaped bottom lower portion to the substantially shaped upper portion.

3. The blender container of claim 1, wherein each of the spaced ribs has a maximum depth of approximately 13.5 mm and a maximum width of approximately 23.4 mm.

4. The blender container of claim 3, wherein each of the spaced ribs has a depth of approximately 6 mm and a width of approximately 17 mm.

5. The blender container of claim 1, wherein the processing zone is sized for about 1.89 liters.

6. The blender container of claim 1, wherein the blade assembly includes a plurality of blades, and further wherein each of the plurality of blades extends at a different angle with respect to a horizontal plane.

7. The blender container of claim 6, wherein the plurality of blades constitute four blades which extend at angles of 75-80°, 50-55°, 19-25° and 15-18° respectively form the horizontal plane.

8. A blender appliance comprising:
a base section including a motor and a plurality of control elements;

a blender container configured to be received on the base section, the blender container including:
  a processing zone defined by a side wall and a bottom wall, wherein the processing zone includes an upper portion having a substantially teardrop shaped configuration having a smooth continuous non-linear shape at the end of the teardrop, and a lower portion having a substantially rectangular shaped configuration, and further wherein the bottom wall includes an outer boundary;
  a base portion extending downwardly from the bottom wall and configured to be received on the blender appliance, the base portion having a boundary surface that is smaller than the outer boundary of the bottom wall, such that the bottom wall extends outwardly from the outer boundary of the base portion;
  a blade assembly rotatably received in the processing zone adjacent the bottom wall, the blade assembly in driven engagement with the motor and having a plurality of blades defining a processing path having an outer perimeter, wherein the outer perimeter of the processing path extends outwardly from the boundary surface of the base portion;
  a plurality of substantially polygonal shaped, spaced ribs projecting into the processing zone from the side wall, each of the plurality of spaced ribs including a width and a depth, wherein both the width and the depth taper from a top end section adjacent the upper portion of the blender container to a more narrow bottom end section adjacent the bottom wall of the blender container;
  and wherein a recess is formed in an outer surface of the container behind each rib, wherein each recess tapers in depth and width from a top end section adjacent, the upper portion of the blender container to a more narrow bottom end section adjacent the bottom wall of the blender container, to enhance nesting of a like blender container; and
  a handle coupled to an outer surface of the side wall and having an outwardly opening channel, wherein the channel includes an outwardly extending lip portion and a tapered stem portion extending downwardly from the lip portion, the tapered stem portion configured to be received in a channel of a handle disposed on a like blender container in a nested configuration.

9. A blender container for a blender appliance comprising:
a processing zone defined by a side wall and a bottom wall, the side wall including:
  an upper portion disposed adjacent to an upper opening to the processing zone, wherein the upper portion includes a substantially teardrop shaped configuration having a smooth continuous non-linear surface at the end of the teardrop;
  a lower portion of the side wall having a substantially rectangular shaped configuration defined by a plurality of side wall sections;
a base portion extending downwardly from the bottom wall and configured to be received on the blender appliance, the base portion having a boundary surface defining an outermost portion of the base portion;
a blade assembly rotatably received in the processing zone adjacent the bottom wall, the blade assembly having a plurality of blades defining a processing path, the processing path having an outer perimeter, wherein the outer perimeter of the blade assembly is greater than the boundary surface of the base portion; and
a plurality of substantially polygonal shaped, spaced ribs projecting into the processing zone from the side wall, each of the plurality of spaced robs including a width and a depth; wherein both the width and the depth of the spaced ribs taper from a top end section adjacent the upper portion of the blender container to a more narrow bottom end section adjacent the bottom wall of the blender container; and wherein a recess is formed in an outer surface of the container behind each rib, wherein each recess tapers in depth and width from a top end section adjacent the bottom wall of the blender container, to enhance nesting of a like blender container.

10. The blender container of claim 9, wherein the side wall continuously and gradually transitions from the substantially rectangular shaped bottom lower portion to the substantially teardrop shaped upper portion.

11. The blender container of claim 10, further comprising:
  a handle coupled to an outer surface of the side wall and having an outwardly opening channel defined by first and second side walls having a web portion disposed therebetween, wherein the channel includes an outwardly extending lip portion and a tapered stem portion extending downwardly from the lip portion, the tapered stem portion configured to be received in a channel of a handle disposed on a like blender container in a nested configuration.

12. The blender container of claim 9, wherein each of the plurality of blades extends at a different angle with respect to a horizontal plane.

13. The blender container of claim 12, wherein the plurality of blades constitute four blades which extend at angles of 75-80°, 50-55°, 19-25° and 15-18° respectively form the horizontal plane.

14. The blender container of claim 13, wherein each of the plurality of blades includes a leading edge that is beveled on a bottom surface thereof such that, during use, the beveled edges provide a downward suction force to draw ingredients down into the processing path.

15. The blender container of claim 9, wherein the processing zone is sized for about 1.89 liters.

* * * * *